Nov. 3, 1964 F. H. MANN ETAL 3,155,910

I.F.-CONTROLLED SQUELCH CIRCUIT FOR NARROW BANDWIDTH RECEIVERS

Filed May 3, 1962

INVENTORS:
ARCHIE V. MILLER,
FRIEDRICH H. MANN,
BY J. David Blumenfeld
THEIR ATTORNEY.

United States Patent Office
3,155,910
Patented Nov. 3, 1964

3,155,910

I.F.-CONTROLLED SQUELCH CIRCUIT FOR NARROW BANDWIDTH RECEIVERS

Friedrich Harald Mann and Archie V. Miller, Lynchburg, Va., assignors to General Electric Company, a corporation of New York Filed May 3, 1962, Ser. No. 192,176
3 Claims. (Cl. 325—478)

This invention relates to a communication receiver and more particularly to a receiver having novel and unique muting or "squelch" circuitry whereby the receiver is operative only when a carrier is being received and is inoperative during intervals in which no carrier is being received so that ignition or other types of noise are not reproduced.

In communication receivers, particularly of the type used in two-way mobile radio equipment, the receiver is customarily left in a stand-by condition ready to receive any messages transmitted over the air. During the intervals when no messages are being received from a distant transmitter, random noise signals generated both externally and internally of the equipment are intercepted and reproduced. Thus, for example, ignition noises, atmospheric noise, noises generated by motors or similar electrical devices, as well as "shot noise" generated within the active elements of the receiver are reproduced in the audio circuitry and the speaker. These random noise signals which are commonly referred to as "static" have a very annoying and irritating quality and may induce great fatigue in the operator exposed to such noise for any length of time. Hence, some means is desirable for automatically disabling or "muting" the audio circuits of the receiver during those intervals when no carirer signal is being received. Circuits for achieving this purpose and for controlling the audio circuitry of the receiver are customarily referred to as either "muting" or "squelch" circuits and these terms will be used interchangeably throughout this specification.

One previously known arrangement for squelching the audio circuit of a receiver in the absence of a carrier signal, is that so-called "noise squelch" in which the noise output of the discriminator, in the absence of a carrier signal, is converted to a unidirectional voltage which is used to control the audio circuits of the receiver. The unidirectional noise voltage is produced by providing a noise filter having a frequency passband lying outside of the audio frequencies which represent the intelligence in the received carrier. In the absence of a carrier the noise signals are utilized to generate a control voltage to disable or "squelch" the audio stages of the receiver. When a carrier is received, the noise disappears and the squelch circuit is disabled thereby "unsquelching" the receiver and permitting the received signal to be reproduced.

"Noise squelch" circuits of this type, can however, only be used when the bandwidth of the intermediate frequency (I.F.) of the receiver is greater than the bandwidth of the received audio signal, for only then can the noise filter discriminate between the audio signal and noise. However, with the increasing crowding of the frequency spectrum, the I.F. bandwidth of communication systems as set forth by the Federal Communications Commission are extremely narrow and are only sufficient to accommodate the transmitted audio in an intelligible form. Thus, for example, with so-called "split-channel" operation, the permissible frequency deviation of an F.M. signal as permitted by the Federal Communications Commission is only 2.5 kc. It is obvious that the total permissible bandwidth of the intermediate frequency signal of the receiver must be used for the voice intelligence in the carrier in order to reproduce an intelligible message. The I.F. bandwidth is thus no longer sufficiently wide to permit use of noise sequelch, for if the passband of the noise filter overlaps the voice frequency bands, the voice frequencies will be converted to a D.C. control voltage in the squelch circuit thereby disabling or muting the audio circuits. As a result, the received audio signal is clipped and intelligibility of the message is lost. Hence, it is apparent that the limitations of "noise squelch" systems are such that other more effective techniques for controlling the audio circuits of the receivers must be found.

It is therefore an object of this invention to provide a squelch system for a communication receiver which is particularly adapted for narrow band operation and which does not depend on the presence of noise signals to control the muting or squelching of the receiver.

In an effort to overcome the various limitations of noise squelch arrangements, it has been proposed to utilize the rectified intermediate frequency (I.F.) of the receiver to control the audio squelch circuitry. That is, as long as intermediate frequency signal is present, indicating that a carrier signal is being received, the rectified intermediate frequency signal is utilized as a control voltage to disable the squelch circuit thereby permitting the audio circuits to reproduce the desired voice or audio intelligence. In the intervals when there is no received carrier signal, it will be apparent that the intermediate frequency also disapears thereby removing the control voltage for the squelch circuit. The squelch circuit is thereby activated and the audio circuit is "squelched."

While such an I.F. squelch system solves a number of the problems set forth above and is particularly useful in narrow band operation, it does suffer from several inherent disadvantages which have severely limited its utility and which have prevented its widespread acceptance in communication receivers. The most fundamental of these inherent disadvantages is that the system is very susceptible to ignition noises. That is, ignition noise impulses, pulsations due to intermodulation, or in fact, noise impulses of almost any sort, are amplified in the receiver and will actuate the squelch circuit and unmute the audio circuit, permitting passage of ignition and other noise impulses to the speaker.

It is therefore another object of this invention to produce a squelch circuit which is controlled by the presence and absence of an intermediate frequency signal which is highly reliable, efficient, and simple in operation;

Yet another object of this invention is to produce an improved squelch circuit for a communication receiver which is not susceptible to ignition or other impulses;

Other objects and advantages of this invention will become apparent as the description thereof proceeds.

In accordance with the present invention, the foregoing objectives are achieved by providing a squelch apparatus which is responsive to a rectified intermediate frequency signal but which is not responsive to ignition or other types of impulses.

The novel features which are believed to be characteristic of this invention are set forth with particularly in the appended claims. The invention itself, however, both as to its organization and method of operation, together with further objects and advantages thereof, may best be understood by reference to the following description taken in conjunction with the accompanying drawings in which:

Figure 3A:
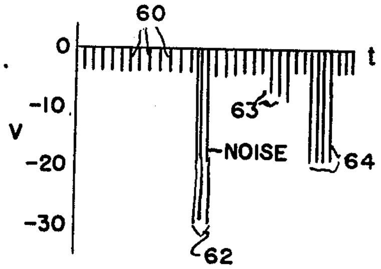
Figure 3B:
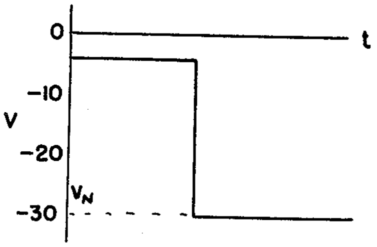
Figure 3C:
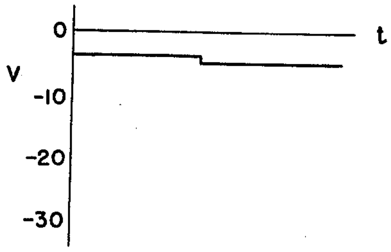

FIGS. 3*a*–3*c* illustrate graphically certain of the operational characteristics of novel squelch receiver.

In practicing the invention, a unidirectional control voltage for the squelch circuit is obtained from the rectified intermediate frequency (I.F.) signal, either at the limiter stage or at some other desirable stage, by means of a suitable network which is characterized by the fact that it produces the desired unidirectional control voltage in response to the intermediate frequency signal but substantially completely suppresses ignition noise or other types of noise impulses. Suppression of the ignition noise or other noise impulses is achieved by providing an asymmetrically conducting current path for charging a storage capacitor. The conducting path includes a diode shunting one of the charging resistances so that the R-C time constant for one direction of flow is substantially different than the R-C time constant of the network for the other direction of current flow. The rectified I.F. signal is therefore permitted to charge up the capacitance of the R-C circuit whereas any impulse signal such as ignition noise or intermodulation impulses, bring the asymmetrical conductive characteristic of the charging network into play. That is, any impulse type of signal has both a relatively positive going and relatively negative going wave front. During one of these wave fronts the diode is in a conducting condition and effectively bypasses one of the resistors thereby changing the conducting characteristics of the network to discharge the capacitor rapidly thereby neutralizing the effect of the rectified noise impulse.

Figure 1:
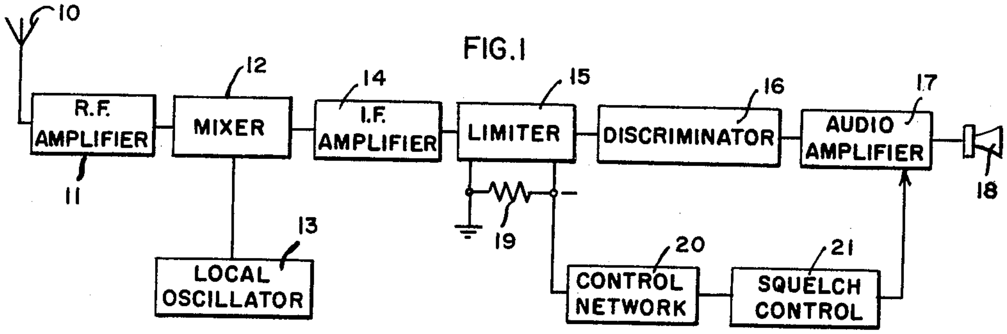
FIG. 1 is a block diagram of a communication receiver incorporating a novel squelch circuit.

FIG. 1 of the drawing shows, in block diagram form, a narrow band frequency modulation receiver employing the novel squelch circuit of the instant invention, although it will be understood that the invention is not limited to F.M. receivers but may be used with equal facility in A.M. receivers. An antenna 10 is connected to one or more radio frequency amplifying stages 11 for amplifying the low level carrier signal intercepted by the antenna. The R.F. amplifier stages 11 are in turn connected to a mixer or converter stage 12 for mixing with a local oscillator signal from local oscillator 13. The output of mixer 12 is therefore an intermediate frequency (I.F.) signal which is amplified in one or more frequency amplifier stages illustrated generally at 14. A final intermediate frequency amplifier stage is connected to one or more limiting amplifier stages, illustrated generally at 15, wherein the amplitude of the intermediate frequency signal is limited. The output of limiter 15 is connected to a frequency discriminator stage 16 whose output is an audio signal which is reproduced and amplified in the audio amplifying stage 17, and then applied to a reproducing element such as a loud speaker 18. The limiting amplifier stage 15 includes one or more stages which employ grid controlled vacuum tubes connected in such a manner that the intermediate frequency signal impressed upon the limiter produces a voltage of negative polarity on the control grid of the vacuum tube due to grid rectification. The rectified negative voltage, as shown diagrammatically, appears across the resistor 19 with the polarity indicated there.

The rectified intermediate frequency signal appearing across resistor 19 is applied to a control network 20 for producing at the output thereof a control voltage which is impressed upon a squelch control circuit 21 which may constitute one or more stages and which in turn controls the receiver audio amplifier circuits 17. The control network 20, as has been pointed out above, is characterized by the fact that the control voltage appearing at its output terminal is a function of the presence or absence of the intermediate frequency signal and is effective to suppress or neutralize the effects of any ignition noise or other impulses appearing at the output of the limiter stage 15. Hence, the squelch control circuit is made operative to control the audio circuits of the receiver in such manner that the received carrier signal and the audio information contained therein is reproduced and the receiver is squelched during those intervals when no carrier signal is being received. Furthermore, the squelch circuit is characterized by the fact that it is insensitive to rectified noise impulses thereby precluding the possibility of unmuting or unsquelching the audio circuit in response to a rapid succession of ignition or other noise impulses.

Figure 2:
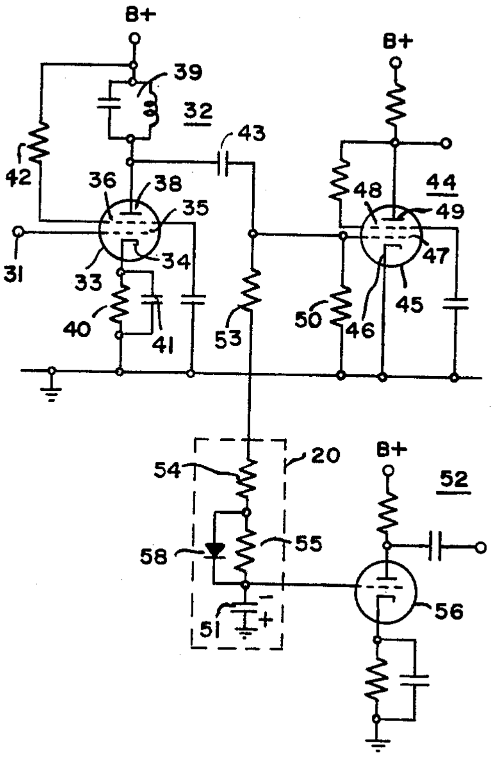
FIG. 2 is a schematic of a portion of the novel squelch circuit.

FIG. 2 illustrates a portion of the novel squelch and control circuit of FIG. 1 and particularly the asymmetric current conducting path which is operative to desensitize the squelch circuit against the effects of ignition or other impulse noises. The intermediate frequency signal from one or more preceding intermediate frequency amplifier stages are applied to an input terminal 31 which is connected to the control grid of the final amplifying stage 32. The final amplifying stage 32 consists of a tetrode 33 having a cathode 34, a control grid 35, a screen grid 37 and an anode 38. The anode 38 is connected through a tuned circuit 39 resonant at the I.F. frequency to the positive terminal of a suitable source of unidirectional energizing voltage indicated generally at B+. The cathode is connected to a grounded bus through a suitable cathode resistance 40 which is bypassed for A.C. by a shunt capacitance 41. The screen grid 37 is maintained at a suitable positive potential by means of a screen dropping resistance 42 connected to the screen grid and the positive terminal of the source of energizing voltage and is bypassed for A.C. by means of the screen grid bypass capacitor 43. The amplified I.F. output signal from stage 32 is coupled through a coupling capacitor 43 to the control grid of a limiter stage shown generally at 44.

Limiter 44 similarly includes a tetrode 45 having a cathode 46 connected directly to the grounded bus, a control grid 47, a screen grid 48, and an anode 49. The anode 49 is connected to the positive terminal of a suitable source of unidirectional energizing voltage through a suitable anode resistor and the screen grid is maintained at a suitable positive potential through a screen dropping resistance that is bypassed for A.C. by means of a screen bypass capacitor. Since the cathode 46 of limiting amplifier 42 is connected directly to the grounded bus, the control grid and cathode are substantially at the same potential, i.e., ground or zero volts, producing grid rectification whenever an intermediate frequency signal is applied to the control grid of limiter 44. The flow of grid leak current across grid leak resistance 50 develops a negative voltage across the grid resistor, which negative unidirectional voltage is applied to the control network 20 of the squelch circuit.

The negative grid leak voltage, referred to above, is utilized to charge a storage capacitor 51 in the control network to produce a squelch control voltage for selectively enabling and disabling the squelch circuit. That is, storage capacitor 51 charges up to the value of the rectified I.F. voltage appearing at the grid of limiter 44 with the polarity indicated there to control a squelch control circuit shown generally at 52. Storage capacitor 51 is charged through series connected resistors 53, 54 and 55. The control voltage developed across the storage capacitor 51 is directly coupled to the control grid of a triode squelch control tube 56, the output of which is coupled either directly or through a suitable number of intermediate stages to the audio amplifier stages of the receiver to control these amplifiers in response to the control voltage.

The charging path for capacitor 51 includes a shunting diode 58 connected across charging resistance 55. Diode 58 is so poled that it, under normal circumstances, i.e., with the presence of a negative rectified I.F. signal, diode 58 does not conduct. Thus, whenever a carrier is being received and an I.F. signal is applied to limiter tube 44, the R-C time constant of the charging network 20 is determined by resistances of resistors 53, 54 and 55 and the capacitance of capacitor 51. As soon as the I.F. signal disappears, whenever the carrier disappears, storage capacitor 51 discharges, to remove the control voltage from the squelch circuit. However, this charge path for capacitor 51 is a different time constant than the charging path, and as a result, the control voltage across capacitor 51 discharges rapidly. Upon the disappearance of the rectified intermediate frequency signal, it will be apparent that the unidirectional negative voltage at the control grid of limiter 44 disappears. The cathode of diode 58 is now negative with respect to its anode by virtue of the negative voltage of capacitor 51 and diode 58, which has previously been maintained in the nonconducting state by the negative unidirectional voltage at the control grid of limiter 44, becomes conducting, thereby bypassing resistor 55 and permitting discharge of the charge on capacitor 51 through diode 58, the resistances 54 and 53, and grid leak resistance 52 ground.

In addition to permitting rapid discharge of the control voltage across capacitor 51 whenever the intermediate frequency signal disappears, diode 58 performs another extremely useful function. The presence of diode 58 makes the squelch circuit insensitive to ignition noise or other types of interfering impulses. Thus, in the interval when there is no I.F. signal, the appearance of an ignition noise impulse, for example, which under normal circumstances may have an amplitude several times larger than the amplitude of a typical I.F. signal, causes capacitor 51 to charge up resistors 53, 54 and 55. If a series of closely spaced noise pulses were to occur, capacitor 51 would charge up to some value of negative voltage in the absence of diode 58. The charging of capacitor 51 would, of course, tend to develop a control voltage there across which is no different than that developed due to the presence of an I.F. signal. Hence, one or more closely spaced ignition impulses of this type might disable the squelch circuit and unmute the audio circuits to permit the passage of such noise impulses even though no I.F. signal is present. However, because of the presence of diode 58, the voltage to which capacitor 51 is charged due to the negative going front edge of any given noise impulse is rapidly dissipated since the positive going edge of the noise impulse causes diode 58 to become conducting. This reduces the R-C time constant of the path and storage capacitor 51 is quickly discharged.

The operation of the novel squelch circuit in FIG. 1 and FIG. 2 may best be understood by reference to FIGS. 3*a*–3*c*. As shown in FIG. 3*a*, the voltages at the control grid limiter 44 may be either the I.F. signal, noise impulses, or both, with the I.F. signal represented by curve 60, and the randomly occurring ignition impulses by the pulses 62, 63 and 64. As long as a carrier signal is being received and a rectified negative unidirectional potential appears at the control grid of limiter 44, and consequently charges storage capacitor 51 to that value, a negative bias is applied to the control grid of squelch triode 56 which is sufficiently great to maintain it in the nonconducting stage. The remaining stages of the squelch circuit, not shown, therefore, maintain the audio amplifier stage 17 in the conducting condition permitting passage of the audio signal from the discriminator to the loud speaker.

Whenever the I.F. signal disappears, the negative voltage at the control grid of limiter 44 also disappears, and capacitor 51 discharges through diode 58, resistances 54, 53 and grid leak resistance 52 to ground. Diode 58, as will be appreciated, becomes conducting since its cathode is now more negative than its anode which is at ground potential. As soon as storage capacitor 51 is discharged, the control grid of the squelch control tube 56 goes to ground potential and triode 56 becomes conducting. As triode 56 becomes conducting, the voltage at its anode goes more negative and a control pulse is coupled through the coupling capacitance to the remaining stages, not shown, to cut off audio amplifying stage 17 thereby disabling the receiver and permitting the passage of noise impulses to the loud speaker 18.

If a series of ignition noise impulses 62, 63 and 64 occur during this interval when there is no intermediate frequency signal, and particularly if these are closely spaced, capacitor 51 charges through resistances 53, 54 and 55 during each negative going front edge of the pulse to a value $V_N$ representing the amplitude of these noise impulses as shown and illustrated in FIG. 3*b*. Unless some means is provided for rapidly discharging the capacitor 51 between each pulse, control tube 56 becomes nonconducting and its anode voltage rises transmitting a positive control pulse to the remaining stages and thereby unsquelching audio amplifier 17 and permitting the passage of ignition noise or other impulses to the speaker 18. Diode 58 performs this function of rapidly discharging the control voltage on capacitor 51. During the positive going back edge of the pulse the cathode of diode 51 becomes more negative than its anode and diode 51 conducts shunting charging resistor 55 and reducing the time constant of the R-C circuit. This permits rapid discharge of capacitor 51 to ground thereby preventing the capacitor from charging up to any substantial voltage. Thus, as shown in FIG. 3, capacitor 51 does not charge very much above the value of the rectified I.F. signal, when that signal is present impulses and discharges substantially back to zero in the absence of an I.F. signal.

It can be seen therefore that the asymmetrical current conducting path which is provided for the squelch circuitry is effective to prevent the squelch circuitry from being accidentally actuated by one or a succession of noise impulses during the interval when no carrier signal is being received and hence no intermediate frequency signal is present at the limiter grid. This asymmetric conductive characteristic is provided by virtue of the diode which has a high resistance to conduction in one direction and a low resistance in the other, and thereby changes the time constant for charging capacitor 51.

It will be understood by those skilled in the art that the rectified I.F. signal which is utilized to provide the control voltage for the "squelch" circuit need not necessarily be obtained by grid rectification at the limiter grid since obviously a separate rectifying element may be utilized.

In a typical circuit constructed in accordance with the invention the following values for the various circuit components were used although these are exemplary only:

| | |
|---|---|
| $R_{50}$=200K | $R_{55}$=39M |
| $R_{53}$=270K | $C_{51}$=50 pf. |

Diode 58=Hughes Silicon Diode—HD 622 5

With diode 58 in the conducting condition its resistance is approximately 100Ω. It is apparent, therefore, that the resistance of the charging path changes from approximately 39–47 megohms to .47 megohm as the diode goes from the nonconducting to the conducting state. The R-C time constant of the circuit will be correspondingly reduced to permit rapid discharge of capacitor 51.

Although a number of specific embodiments of the invention have been shown, it will, of course, be understood that the invention is not limited thereto since many modifications both in the instrumentalities and circuit arrangement employed may be made. It is contemplated by the appended claims to cover any such modifications which fall within the true spirit and scope of this invention.

What is claimed as new and desired to be secured by Letters Patent is:

1. A narrow band radio receiver for receiving a modulated carrier wave including means for translating the carrier wave to a lower frequency, said receiver being of the type wherein the handwidth of the translated carrier wave is entirely occupied by the modulating intelligence, means for detecting the modulating intelligence and means for reproducing the modulating intelligence, carrier operated squelch circuitry for said reproducing means to control said reproducing means solely in response to the carrier wave to prevent reproduction of noise including means for producing a unidirectional control voltage in response to said carrier wave to disable said squelch circuit and enable said reproducing means, said last named means including a capacitor means and means constituting a first charge path for charging said capacitor to the level of said control voltage, said squelch circuit being susceptible to improper actuation by short duration noise impulses in the absence of a carrier or by noise impulses which have a large amplitude compared to the carrier, and means constituting an alternate discharge path for rapidly discharging said capacitor whenever a noise impulse of short duration and high amplitude charges said capacitor including a unidirectional conducting device which is so poled as to be nonconducting for the leading edge of any short duration impulses to permit charging of said capacitor through said first path and is in a conducting state during the trailing edges of said impulses to permit rapid discharge of said capacitor whereby the squelch circuitry is made insensitive to high amplitude short duration noise impulses.

2. In a narrow band radio receiver, according to claim 1, whereby said first means constituting a first charge path includes a resistance means connected in series with said capacitor.

3. In a narrow band radio receiver, according to claim 2, wherein said unidirectional conducting device in said alternate path comprises a diode shunting a portion of the resistance means connected in series with said capacitor.

References Cited in the file of this patent

UNITED STATES PATENTS

| | | |
|---|---|---|
| 2,912,571 | Jacobsen et al. | Nov. 10, 1959 |
| 2,918,571 | Peth | Dec. 22, 1959 |

OTHER REFERENCES

Terman: Radio Engineers' Handbook, McGraw-Hill Book Co. Inc., New York, 1943, pp. 653–654.